US008673828B2

(12) United States Patent
Pinel et al.

(10) Patent No.: US 8,673,828 B2
(45) Date of Patent: Mar. 18, 2014

(54) LUBRICATING COMPOSITION WITH AN ADAPTABLE COEFFICIENT OF FRICTION, FOR A THREADED ELEMENT OF A COMPONENT OF A TUBULAR THREADED JOINT

(75) Inventors: Eliette Pinel, Sainte-Euphemie (FR); Eric Gard, Sathonay Village (FR); Nicolas Baudin, Pont sur Sambre (FR)

(73) Assignees: Vallourec Mannesmann Oil & Gas France, Aulnoye-Aymeries (FR); Nippon Steel & Sumitomo Metal Corporation, Tokyo (JP)

( * ) Notice: Subject to any disclaimer, the term of this patent is extended or adjusted under 35 U.S.C. 154(b) by 511 days.

(21) Appl. No.: 12/595,091

(22) PCT Filed: Apr. 4, 2008

(86) PCT No.: PCT/FR2008/000473
§ 371 (c)(1),
(2), (4) Date: Oct. 8, 2009

(87) PCT Pub. No.: WO2008/139058
PCT Pub. Date: Nov. 20, 2008

(65) Prior Publication Data
US 2010/0167968 A1 Jul. 1, 2010

(30) Foreign Application Priority Data

Apr. 11, 2007 (FR) ....................................... 07 02634

(51) Int. Cl.
*C10M 169/04* (2006.01)

(52) U.S. Cl.
USPC ........... 508/110; 508/390; 508/459; 508/469; 508/519

(58) Field of Classification Search
USPC .......................... 508/110, 390, 459, 469, 519
See application file for complete search history.

(56) References Cited

U.S. PATENT DOCUMENTS 3,180,831 A * 4/1965 Odell et al. ................... 508/184
5,173,204 A 12/1992 Chiddick et al.
5,431,831 A 7/1995 Vincent (Continued)

FOREIGN PATENT DOCUMENTS

JP  52-119754  10/1977
JP  2001-65753  3/2001

(Continued)

OTHER PUBLICATIONS

U.S. Appl. No. 12/595,554, filed Oct. 12, 2009, Bordet, et al.
U.S. Appl. No. 13/123,909, filed Apr. 13, 2011, Pinel, et al.

*Primary Examiner* — Taiwo Oladapo
(74) *Attorney, Agent, or Firm* — Oblon, Spivak, McClelland, Maier & Neustadt, L.L.P.

(57) ABSTRACT

A thin adhesive lubricating composition that can cover at least one thread and a screwing abutment of a threaded element of a component of a tubular threaded joint. The screwing abutment can bear against another abutment of another component of the tubular threaded joint in a terminal make up phase. The lubricating composition includes a matrix in which there is dispersed at least one braking additive selected to impart thereto, in addition to lubrication, a coefficient of friction to make it possible to obtain a torque on shoulder resistance value at least equal to a threshold value.

29 Claims, 2 Drawing Sheets (56) References Cited

U.S. PATENT DOCUMENTS

| | | | | |
|---|---|---|---|---|
| 5,454,965 | A | * 10/1995 | Shanahan et al. | 508/486 |
| 6,933,264 | B2 | * 8/2005 | Petelot | 508/318 |
| 2004/0092408 | A1 | * 5/2004 | Willey et al. | 508/165 |
| 2004/0239105 | A1 | * 12/2004 | Matsumoto et al. | 285/94 |
| 2006/0228505 | A1 | * 10/2006 | Goto et al. | 428/36.9 |

FOREIGN PATENT DOCUMENTS

| | | |
|---|---|---|
| JP | 2005-507971 | 3/2005 |
| WO | WO 03/038016 A1 | 5/2003 |
| WO | 2006 104251 | 10/2006 |
| WO | 2007 042231 | 4/2007 |

* cited by examiner

LUBRICATING COMPOSITION WITH AN ADAPTABLE COEFFICIENT OF FRICTION, FOR A THREADED ELEMENT OF A COMPONENT OF A TUBULAR THREADED JOINT

The invention concerns components of tubular threaded joints which are used for example in petroleum applications and more precisely the lubrication of a portion or portions of a threaded element or elements of components of tubular threaded joints comprising a screwing abutment.

The term "component" as used here means any element or accessory intended to be assembled by a thread to another component to constitute with that other component a tubular threaded joint. The component may be for example a tube of relatively great length (in particular about some ten meters in length), a tubular sleeve of some tens of centimeters in length, or an accessory for such tubes (a suspension device or hanger, a section-changing part or cross-over, a safety valve, a connector for a drill pipe or tool joint, and the like).

Such a component may be used for example for drilling or working a well. In that case the components are assembled together in order to be lowered into the hydrocarbons well or similar wells and to constitute a drill string, a casing string or a liner string or also a tubing string (working string).

The threaded elements produced at the end of a component (tube or sleeve) firstly have to be protected from corrosion during transport and storage on the drilling site and for that purpose they are traditionally coated with protective oils or greases on issuing from the manufacturing workshop.

Figure 1:
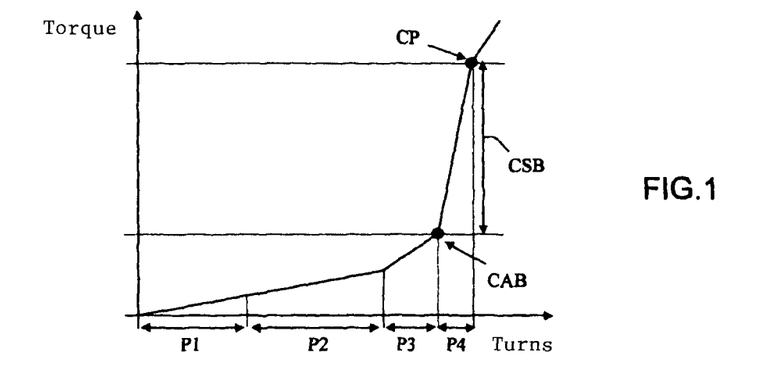

At wells they may have to undergo a plurality of make up (tightening) and break out (untightening) operations. A make up operation is defined by a profile (or curve) which expresses the make up torque depending on the number of turns of rotation made. An example of a make up torque profile corresponding to a premium threaded joint with tapering threads is diagrammatically illustrated in FIG. 1. As can be seen, a make up torque profile can be generally broken down into four parts. A first part P1 during which the outer threads of the male threaded element (or "pin") of a first component of a tubular threaded joint do not yet involve any radial tightening (interference fit) with the inner threads of the corresponding female threaded element (or "box") of a second component of the same tubular threaded joint. A second part P2 during which the geometrical interference of the threads of the male and female threaded elements generates a radial tightening which increases in proportion to the progress of the make up operation (generating a low but increasing make up torque). A third part P3 during which a sealing surface at the outer periphery of the end part of the male threaded element interferes radially with a corresponding sealing surface of the female threaded element to produce a metal/metal seal. A fourth part P4 during which the front end surface of the male threaded element is in axial abutment with the annular surface of a screwing abutment of the female threaded element. That fourth part P4 corresponds to the terminal make up phase.

The make up torque CAB which corresponds to the end of the third part P3 and the beginning of the fourth part P4 is referred as the shouldering torque. The make up torque CP which corresponds to the end of the fourth part P4 is referred to as the plastification torque. Beyond that plastification torque CP it is considered that the male screwing abutment (end portion of the male threaded element) and/or the female screwing abutment (the zone disposed behind the annular abutment surface of the female threaded element) is the object of plastic deformation which can cause a deterioration in the sealing performances of the contact between sealing surfaces.

The difference between the values of the plastification torque CP and the shouldering torque CAB is referred to as the torque on shoulder resistance and is identified as CSB (CSB=CP−CAB).

A tubular threaded joint is the object of an optimum tightening at the end of make up, which is the sign of an optimum mechanical strength of the threaded assembly, for example in relation to tensile forces but also accidental break out in a service situation, and optimum sealing performances. The designer of the threaded joint is thus induced to define, for a given type of threaded joint, an optimum make up torque value which, for all the assemblies of that type of joint, must be lower than the plastification torque CP (to avoid plastification of the abutments and the disadvantages which result therefrom) and higher than the shouldering torque CAB. Terminating a make up at a torque less than CAB does not in fact make it possible to guarantee correct relative positioning of the male and female elements and hence suitable tightening of their sealing surfaces against each other. The effective value of the shouldering torque CAB fluctuates greatly from one assembly to another for the same type of joint as it depends on the effective diameters of the threads and the sealing surfaces, both male and female, and it is appropriate for the optimum make up torque to be substantially greater than the shouldering torque CAB. Consequently, the greater the value of the torque on shoulder resistance CSB, the greater the margin that will be available to define the optimum make up torque and the more the threaded joint will be capable of withstanding the forces occurring in operation.

In order to protect the sensitive portions such as the threads from galling in the make up and break out operations the threads are traditionally freed of the protective grease and coated with special make up greases such as a grease in accordance with API RP 5A3 (formerly API Bull. 5A2). The use of such greases charged with heavy and/or toxic metals such as lead, in addition to the disadvantage of the need to perform a second coating operation at a well, suffers from the disadvantage of causing pollution of the wells and the environment as the grease excess is ejected from the threads during make up.

Other types of protection have been proposed.

Thus U.S. Pat. No. 6,933,264 proposes replacing the two successive coatings with grease by a single coating which is implemented at the workshop for manufacture of the threaded elements, using a thin layer of a lubricant of a pasty or waxy consistency (referred to as semi-dry), comprising at least one extreme-pressure additive with a chemical action.

That thin layer constitutes a semi-dry coating which suffers from the disadvantage of requiring mechanical protection from pollution by particles of dust or sand during transport and storage.

Other patent documents such as for example U.S. Pat. No. 4,414,247, U.S. Pat. No. 4,630,849, U.S. Pat. No. 6,027,145, U.S. Pat. No. 6,679,526 B2, US No. 2004/0166341 A1 and WO 2004/033951 propose replacing the greases by various protective coatings in the solid state which are applied at the workshop for manufacture of the threaded elements, and comprising a solid matrix which adheres to the substrate, in which there are dispersed particles of a solid lubricant or lubricants, among which molybdenum disulphide $MoS_2$ is more particularly mentioned.

WO 2006/104 251 concerns a threaded joint having a viscous lubricating layer covered by a dry solid coating. This coating is not lubricating. The lubricating layer is not solid.

A protective coating in the solid state which causes much less pollution has also been proposed. It is formed by a lubricating matrix affording viscoplastic characteristics, in particular based on thermoplastic material, charged with particles of a solid lubricant or lubricants of at least two different classes. That coating resolves among others the problems involved in successive make up and break out operations, in particular under building site conditions, as well as the problems of protection from corrosion of the threaded elements. Moreover it affords high-quality lubrication. Unfortunately the applicants realised that, under conditions of use, in particular on a building site, the lubrication was so good that it no longer made it possible to tighten the male and female ends of a tubular threaded joint in conformity with the make up torque profile predefined for that tubular threaded joint.

In other words, that coating considerably reduces the amounts of friction at the screwing abutment at the end of make up under heavy Hertzian loads, referred to as "extreme pressure" loads, and at low frictional speeds, so that the plastification torque is reached much too early, and that gives rise to torque on shoulder resistance values which are much lower than the reference values obtained with the grease API RP 5A3. It may then be necessary to reduce the optimum make up torque value tabled for that type of joint and for the reference grease API and in those extreme cases the function of the abutment may no longer be guaranteed.

Therefore the aim of the invention is to improve the situation and more precisely to provide a lubricating (or coating) composition which affords a coefficient of friction which is so selected as to make it possible to achieve a selected torque on shoulder resistance value defined from that which was obtained for the same threaded joint with threaded elements coated with a standard grease API RP 5A3 in such a way as to make it possible to use a standard value for an optimum make up torque (standard value determined with a grease API RP 5A3).

For that purpose it proposes a film-forming lubricating composition for make up of threaded joints, intended to cover at least one thread and a screwing abutment of a threaded element of a component of a tubular threaded joint with a film which is adhesive to the subjacent thread and screwing abutment, said screwing abutment being intended to bear against another abutment of another component of said tubular threaded joint in the terminal make up phase and said lubricating composition comprising a matrix (of any type).

That lubricating composition for make up of threaded joints is characterised in that it further comprises at least one braking additive (intended to regulate the coefficient of friction to higher values while remaining in a lubricated mode) which is dispersed in the matrix and selected in order to impart to the composition, in addition to lubrication, a coefficient of friction selected in such a way as to obtain a torque on shoulder resistance value which is at least equal to a threshold value.

In other words the invention proposes a lubricating composition for make up of threaded joints, whose "braking" effect can be selected as a function of the Hertzian stresses to which the threaded element that it is to partially cover must be subjected at the end of tightening operations. The braking effect can be selected as a function of the friction speed.

In accordance with the requirements of the application being considered, the composition may either be in whole form and more particularly in a solid form to be sprayed in a molten state, or diluted in the form of a dispersion or an emulsion in an organic compound or in water.

The lubricating composition for make up of threaded joints according to the invention can be implemented in accordance with numerous variants, of which some at least of the characteristics can be combined together, more particularly:

the braking additive or additives can be for example selected in such a way as to make it possible to obtain a torque on shoulder resistance value which is at least equal to a threshold value which is itself equal for example to 70% of a torque on shoulder resistance reference value of a grease of type API RP 5A3 but which can be greater than or equal to 100% of said reference value;

the braking additive or additives may be formed by dispersions and/or solutions of mineral or organic particles which have a relatively high value of cleaving force (that is to say which involve a cleaving which requires medium or high shearing values or stresses for it to occur) and/or strong particle interactions or attractive bonds between particles and/or a medium to high Mohs hardness (but without abrasive character) and/or a rheological behaviour which resists or opposes movement;

for example each braking additive is selected from at least bismuth oxide, titanium oxide, colloidal silica, carbon black and acrylic polymers;

the composition by weight of braking additives may be for example as follows:

| | |
|---|---|
| bismuth trioxide | 25 to 99% |
| titanium dioxide | 1 to 75%; | in a first variant the braking additive composition may be for example carbon black alone;

in a second variant the braking additive composition may be for example pyrogenic spherular colloidal silica alone;

particles of solid lubricant or lubricants can be dispersed in the matrix with the braking additive or additives;

the particles of solid lubricant or lubricants may comprise particles of lubricants of at least one (and preferably at least two) of the classes 1, 2, 3 and 4;

for example the particles of solid lubricant or lubricants may comprise particles of at least one solid lubricant of class 2 and at least one solid lubricant of class 1;

as a variant the particles of solid lubricant or lubricants may comprise particles of at least one solid lubricant of class 1 and at least one solid lubricant of class 4;

as a variant the particles of solid lubricant or lubricants may comprise particles of at least one solid lubricant of class 1, at least one solid lubricant of class 2 and at least one solid lubricant of class 4;

as a variant or in addition the particles of solid lubricant or lubricants may comprise at least particles of at least one solid lubricant of class 1 selected from boron nitride and zinc oxide;

as a variant or in addition the particles of solid lubricant or lubricants may comprise particles of at least one solid lubricant of class 2 selected from graphite fluoride, tin sulphides and bismuth sulphides;

as a variant or in addition the particles of solid lubricant or lubricants may comprise at least particles of polytetrafluoroethylene as a solid lubricant of class 4;

the particles of solid lubricants may comprise molecules of at least one fullerene of spherical geometry or tubular geometry;

the matrix may be of a consistency which is solid and non-sticky to touch and may involve a rheological behaviour of plastic or viscoplastic type;

the matrix may have a melting point of between 80° C. and 400° C.;

the matrix may comprise at least one thermoplastic polymer such as for example polyethylene or an acrylic binder;

the matrix may comprise at least one thermosetting binder such as for example epoxy resins, polyurethane, silicone, alkyd urethane and formophenolic resins;

the matrix may comprise at least one mineral binder such as for example an alkaline silicate;

the matrix may comprise at least one binder of chelate type such as for example an organic titanate or silicate;

the matrix may be of a consistency which is solid and non-sticky to the touch and may comprise at least one viscoelastic binder such as for example an elastomer or a latex;

the matrix may comprise at least one metallic soap such as for example zinc stearate, calcium stearate, lithium stearate, aluminium stearate or bismuth stearate;

the matrix may comprise at least one wax or resin of vegetable, animal, mineral or synthetic origin. A resin may comprise colophonic ester so as to increase adhesion on the substrate and to reduce galling;

the matrix may comprise at least one corrosion inhibitor such as for example a derivative of calcium sulphonate or a calcium oxydate;

the matrix may comprise at least one liquid polymer of a kinematic viscosity at 100° C. that is at least equal to 850 mm²/s such as for example an alkyl polymethacrylate, a polybutene, a polyisobutene or a polydialkylsiloxane;

the matrix may comprise at least one colouring agent;

the matrix may comprise at least one surface-active agent (for modifying surface tension) such as a silicone or a silicone derivative which may or may not be modified and which may or may not be functionalised, intended to promote attachment to the surface and homogeneity of the coating;

the matrix may comprise at least one anti-oxidant;

the composition by weight of a thermoplastic matrix may be for example as follows:

| | |
|---|---|
| polyethylene homopolymer | 5 to 96% |
| carnauba wax | 2 to 30% |
| zinc stearate | 2 to 30% |
| calcium sulphonate derivative | 0 to 50% |
| alkyl polymethacrylate | 0 to 15% |
| colouring agent | 0 to 1% |
| anti-oxidant | 0 to 1%; | in a variant the composition by weight of a thermoplastic matrix in the form of an aqueous emulsion can be for example as follows:

| | |
|---|---|
| polyethylene emulsion | 0 to 50% |
| acrylic emulsion | 10 to 80% |
| calcium sulphonate derivative | 1 to 40% |
| alkyl polymethacrylate | 1 to 40% |
| zinc stearate emulsion | 10 to 50%; | the composition by weight of solid lubricants can be for example as follows:

| | |
|---|---|
| graphite fluoride | 65 to 99% |
| zinc oxide | 1 to 35%; | in a first variant the composition by weight of solid lubricants can be for example as follows:

| | |
|---|---|
| graphite fluoride | 20 to 99% |
| boron nitride | 0 to 30% |
| polytetrafluoroethylene | 1 to 80%; | in a second variant the composition by weight of solid lubricants can be for example as follows:

| | |
|---|---|
| tin sulphides | 20 to 99% |
| boron nitride | 0 to 30% |
| polytetrafluoroethylene | 1 to 80%; | in a third variant the composition by weight of solid lubricants can be for example as follows:

| | |
|---|---|
| bismuth sulphides | 20 to 99% |
| boron nitride | 0 to 30% |
| polytetrafluoroethylene | 1 to 80%; | in a fourth variant the composition of solid lubricant can be graphite fluoride alone;

in a fifth variant the composition of solid lubricant can be tin sulphide alone;

in a sixth variant the composition of solid lubricant can be bismuth sulphide alone;

in a seventh variant the composition of solid lubricant can be zinc oxide alone;

its own composition by weight can be for example as follows:

| | |
|---|---|
| thermoplastic matrix | 45 to 93% |
| solid lubricant or lubricants | 1 to 25% |
| braking additive or additives | 5 to 20%; | in a variant the matrix may be of pasty consistency (that is to say having a dropping point). In that case the lubricating composition can comprise at least one extreme-pressure additive with a chemical action.

It is also proposed a threaded element of a component of a tubular threaded joint, comprising at least one thread and a screwing abutment against which another abutment of another component of said same tubular threaded joint is to bear at the end of the make up operation, and in which at least the thread and the screwing abutment are covered with a thin layer which adheres to the surface of the thread and the screwing abutment and is formed by a lubricating composition of the type set forth hereinbefore.

That threaded element can be implemented in accordance with a number of variants in which some at least of the characteristics can be combined together, and in particular:

it can be covered at least partially by a thickness of lubricating composition of between 10 μm and 50 μm;

it may also comprise a sealing surface intended to be in sealing tightening contact with a corresponding sealing surface of another threaded element after the make up operation and covered with the lubricating composition;

its screwing abutment may be an annular abutment surface;

its surfaces which are covered by the lubricating composition may have geometrical, physical and/or chemical characteristics which make them suitable for adsorbing or absorbing said lubricating composition; and its surfaces can be previously coated with a coating or film performing a function of affording protection from corrosion.

It is also proposed a tubular threaded joint comprising a male threaded element and a female threaded element one of which at least is of the type set forth hereinbefore.

Other features and advantages will be apparent from the detailed description set out hereinafter and the accompanying drawings in which:

FIG. 1 diagrammatically illustrates an example of the profile of a make up torque (torque as a function of the number of turns), FIG. 2 diagrammatically shows in a cross-sectional view taken along the longitudinal axis XX an embodiment of a female element of a first component of a tubular threaded joint of the type VAM TOP, FIG. 3 diagrammatically shows in a cross-sectional view taken along the longitudinal axis XX an embodiment of a male element of a second component of a tubular threaded joint of the type VAM TOP, FIG. 4 diagrammatically shows in a cross-sectional view taken along the longitudinal axis XX an embodiment of a tubular threaded joint of the type VAM TOP formed by the assembly of the male and female elements illustrated in FIGS. 2 and 3.

The accompanying drawings can not only serve to complete the invention but also contribute to defining it if appropriate.

The aim of the invention is to propose a film-forming lubricating composition (or coating) for make up of threaded joints? having a coefficient of friction selected so as to obtain a torque on shoulder resistance value which is at least equal to a threshold value on a threaded element of a component of a tubular threaded joint corresponding to a make up torque profile defined in particular by that torque on shoulder resistance value.

It will be considered hereinafter that the component is intended for drilling or exploiting hydrocarbons wells and that it is equipped with at least one male or female threaded element of a sleeved or integral tubular threaded joint of the VAM [registered trade mark] family or equivalent. The invention however is not limited to that type of use nor to the aforementioned type of tubular threaded joint. Indeed the invention concerns any type of tubular threaded joint component irrespective of its use provided that it comprises at least one male or female threaded element provided with at least one thread and a screwing abutment which have to be lubricated by means of the same lubricating composition (or coating).

The rotating speeds may be in the range of 10 to 30 turns/min at the beginning of the make up after engagement of the threads and of 2 to 5 turns/min maximum at the end of make up. The diameters being generally from 50 to 400 mm, the linear speeds are from about 0.3 ms$^{-1}$ at the beginning of make up to about 0.005 ms$^{-1}$ at the end of make up. Moreover, the contact pressure is low at the beginning of make up and very high at the end of make up on the sealing and abutment zones. The friction distances are high between the threads, from the beginning to the end of make up. The friction distances are very low on the sealing and abutment zones (at the end of make up). The lubricating composition is capable of undergoing extreme pressures, for example about 1.5 GPa at the end of make up, and low speeds while reducing the adhesive wear and thread creeping. An increase of friction under high decrease of speed and increase of Hertz stress is interesting. The Bridgmann test is convenient for testing the lubricating composition under consideration, contrary to other tests, for example tests carried out on an Amsler machine which are not relevant in the make up domain as they concern a rolling contact that is absent during the make up of a connection. These requirements very specific to the make up with sealing and abutment zones cause a lubricating composition intended for other uses to be rejected straight off.

Figure 2:
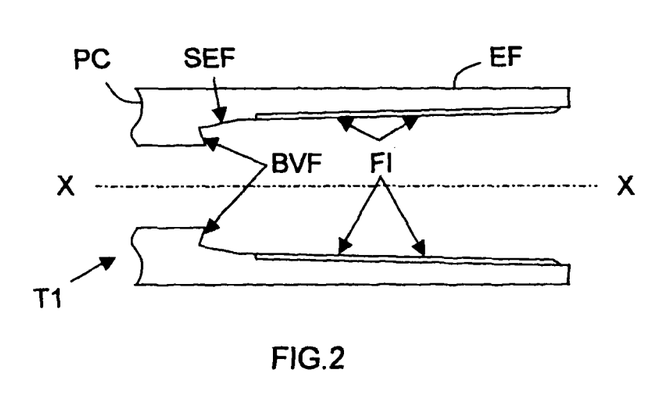
Figure 3:
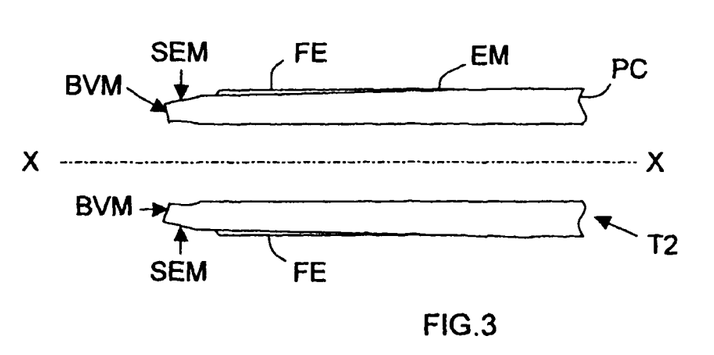

As is shown in FIGS. 2 and 3 a component T1 or T2 comprises a body or running part PC terminated by a threaded element (or end) which is female as indicated at EF or male as indicated at EM.

A female threaded element EF (see FIG. 2) comprises at least one internal thread FI and a screwing abutment BVF which is for example in the form of an annular internal surface (being conical convex in the case of a threaded joint of VAM TOP type) which is disposed downstream of the internal thread FI.

The free end of the female threaded element EF serves here as a reference. Consequently, anything which is after the free end is referred to as being downstream thereof. In the example illustrated in FIG. 2 the internal thread FI is disposed downstream of the free end but upstream of the screwing abutment BVF.

The term "internal" as used here means a portion which is disposed on a surface (or a surface) which is oriented towards the longitudinal axis XX of the female threaded element EF.

As illustrated in FIG. 2 the female threaded element EF may optionally comprise a metal/metal sealing surface SEF interposed between the internal thread FI and the screwing abutment BVF.

A male threaded element EM (see FIG. 3) comprises at least one external thread FE and a screwing abutment BVM which is for example in the form of an annular end surface (being conical concave in the case of a threaded joint of VAM TOP type) disposed upstream of the external thread FE at the level of the free end.

The free end of the male threaded element EM serves here as a reference. Consequently anything which is after the free end is referred to as being downstream thereof.

The term "external" as used here means an element disposed on a surface (or a surface) which is oriented in a direction radially opposite to the longitudinal axis XX of the male threaded element EM.

As illustrated in FIG. 3 the male threaded element EM may optionally comprise a metal/metal sealing surface SEM interposed between the screwing abutment BVM and the external thread FE.

It will be noted that the internal thread FI, like the external thread FE, may be in one or more separate threaded portions which are spaced axially and/or radially from each other and disposed on cylindrical or conical surfaces.

Figure 4:
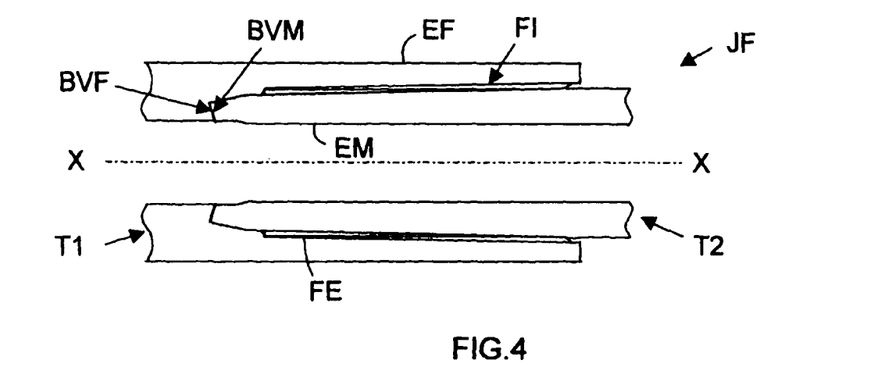

As is shown in FIG. 4 a tubular threaded joint JF is formed by the assembly by making up of a female threaded element EF of a first component T1 to a male threaded element EM of a second component T2. That make up is defined by a make up torque profile of the type illustrated in FIG. 1 and characterised by a shouldering torque CAB, a plastification torque CP and a torque on shoulder resistance CSB (the respective definitions of which have been set forth in the introductory part of this specification).

Make up is effected provided that at least the screwing abutments BVF and/or BVM and the internal thread FI and/or the external thread FE as well as possibly the metal/metal sealing surfaces SEF and SEM of the female threaded element EF and/or the male threaded element EM have been previously coated with a lubricating composition (or composition) according to the invention. That coating (or composition) is preferably deposited on the female and/or male threaded elements EF and EM respectively in their manufacturing workshop.

The lubricating composition according to the invention has a film-forming character. It is capable of forming on a substrate a thin layer (film) intended to adhere thereon. It comprises a matrix in which at least one braking additive is dispersed. As will be seen hereinafter such a lubricating composition is intended to afford a "lubricated braking" behaviour during the phase referred to as friction in relation to plastification of the screwing abutment (that is to say at the end of the tightening phase).

The matrix which is also referred to as the binder makes it possible to fix or carry an active principle to or at a given location. It also serves as a cohesion agent for a heterogenic system and can have functions supplementing those of the active principles that it binds or carries. It may be of any type and in particular involving a consistency which is solid and non-sticky to the touch or else of a pasty consistency (that is to say having a dropping point). It is however preferable for it to involve a rheological behaviour of plastic or viscoplastic type and a lubricating character.

The term "solid consistency" as used here means a consistency (or a state) which is neither liquid nor gaseous nor pasty. More precisely a matrix (or a film) is here referred to as being in a solid state (or consistency) when it has a melting point higher than a temperature corresponding to those to which the constituents are exposed upon storage or use in order to avoid them trapping dust in the atmosphere due to their sticky character and/or contaminating the surfaces which come into contact with the matrix (or the film) and/or polluting the environment by migration, outward flow or extrusion during make up/break out operations.

The frictional mechanisms involved in the operations of making up and breaking out of the tubular threaded joints are rendered complex by the great variety in frictional speeds encountered. In fact the speeds can be relatively substantially in the course of make up and virtually zero at the end of make up (or tightening phase) or at the beginning of break out (or untightening phase). On the other hand the Hertzian stresses are very substantial in the same frictional periods, then leading to limit conditions.

It will be recalled that the term "Hertzian stress (or pressure)" is used to mean the load which is applied by contact to a surface (and which causes thereon elastic deformation) divided by the area of that surface. When high levels of Hertzian stresses are involved solid non-plastic materials may undergo internal shearing effects which reduce their service life due to fatigue of the material while solid plastic materials undergo that shearing in accordance with flow laws with the generation of a friction surface.

To resolve the problems due to the above-mentioned kinetic stresses it is advantageous to use a matrix whose properties involve a plastic characteristic and permit a viscous flow under stresses while complying with all the speed situations encountered. A matrix formed by a plurality of constituents has even better performances in the presence of a wide variety of shearing effects. In fact it makes it possible to keep the other active elements in place and contributes to the production of stable transfer films or leafing effects.

To achieve a rheological behaviour of viscoplastic type it is possible for example to use a matrix in the solid state comprising at least one thermoplastic polymer (or resin) forming part of the whole of the viscoplastic polymers such as for example polyethylene or an acrylic binder. Polyethylene is an attractive proposition as it does not involve any problem in regard to application linked to a high level of viscosity in the molten state as is the case with other viscoplastic polymers such as polyamide 6, polyamide 11 and polypropylene. Among the polyethylenes it is even more advantageous to use those which have melting points higher than 105° C. It is however possible to use a matrix having a melting point of between 80° C. and 400° C.

It will be recalled that the term thermoplastic identifies a fusible polymer which is capable of being reversibly softened and then melted by heating respectively at the temperatures $T_g$ and $T_m$ (glass transition temperature and melting temperature) and solidified and then vitrified by cooling. The thermoplastic polymers are transformed without chemical reaction, in contrast to thermosetting polymers. Thermoplastic polymers are used in the invention in order to achieve under frictional stress a viscous flow while retaining in static fashion a solid structure which is dry (non-sticky to the touch) and stable. In contrast, in general terms, thermosetting polymers have no or have little viscous behaviour under stress.

It will be noted that, when the matrix has to involve a solid consistency and a high-strength mechanical behaviour, it may comprise a binder of thermosetting type such as for example an epoxy resin, or polyurethane, silicone, alkyd urethane or formophenolic resin. In a variant of that type of matrix it is also possible to use mineral binders such as silicates or else chelates such as organic titanates or silicates. In those cases the composition is also non-sticky to the touch.

The matrix may also be of a consistency which is solid and non-sticky to the touch and may involve a viscoelastic behaviour. In that case it may comprise an elastomer or latex.

In order to comply under quasi-static conditions with the limit lubricating stresses in combination with very high frictional loads at least one type of solid lubricant can be dispersed in the matrix.

The term "solid lubricant" as used here means a solid stable body which, upon being interposed between two frictional surfaces, makes it possible to lower the coefficient of friction and to reduce wear of and damage to the surfaces. Those bodies can be classified in different categories which are defined by their operating mechanism and their structure:

class 1: solid bodies owing their lubricating properties to their crystalline structure having between some crystalline planes cleavage properties under low shearing stress, for example graphite, zinc oxide (ZnO) or boron nitride (BN), class 2: solid bodies owing their lubricating properties on the one hand to their crystalline structure as indicated in class 1 and on the other hand to a chemical element of their composition reactive with metallic surfaces, conferring a supplementary property of on-surface fixation favorable to building up a relatively stable lubricating transfer layer, for example molybdenum disulphide $MoS_2$, graphite fluoride, tin sulphides, bismuth sulphides or tungsten disulphide, class 3: solid bodies owing their lubricating properties to their chemical reactivity with the metallic surfaces capable of generating lubricating cleavable or plastic complex compounds, for example certain chemical compounds of thiosulphates type, or Desilube 88 marketed by Desilube Technologies Inc., and class 4: solid bodies owing their lubricating properties to a plastic or viscoplastic behaviour under frictional stress particularly when undergoing shearing, for example polytetrafluoroethylene (PTFE), polyethylene, polypropylene, polyacetal or polyamides.

That classification is for example described in the documents of the course entitled "Les lubrifiants solides" ("Solid lubricants") conducted by Mr Eric Gard at Ecole Nationale Superieure des Petroles et Moteurs (France).

Besides those classes there is the particular category of fullerenes which is classified as a sub-class of class 1 under the nomenclature 1-3. It will be recalled that fullerenes are molecules of spherical or tubular shape, involving a single-layer or multi-layer structure, having properties of reducing friction and generating stable transfer films on the surfaces in friction. It will be possible for example to use carbon fullerenes or fullerenes of metallic disulphides type.

As is known to the man skilled in the art, the lubricants which are solid in the dry and hydrodynamic lubricating operating condition, when they are dispersed in a fluid or viscoplastic material, have a tendency to be fixed on the surfaces in a stable fashion, modifying the frictional characteristics of the surfaces. They are transferred to and bound to the surface by chemical or physico-chemical bonding, which produces a high level of resistance to wear and an improvement in the frictional properties. Depending on the nature of the solids, this imparts to the surfaces an anti-wear protection, resistance and anti-wear properties at the extreme pressures generated by high surface stresses (Hertzian stresses) and a low coefficient of friction over a wide range of loads and frictional speeds. Those properties of generating a transfer film (or a leafing effect) are used for the types of friction in which the surfaces are subjected to forces repetitively, as occurs in operations of making up and breaking out of tubular threaded joints.

The composition may comprise only one single solid lubricant, such as for example graphite fluoride alone or tin sulphide alone or bismuth sulphide alone or again zinc oxide alone.

However the combined use of at least two solid lubricants belonging to different classes makes it possible to achieve synergies and therefore very high levels of lubricating performance. The term "synergy" as used here means a situation in which the combination of solid lubricants having basic properties leads to levels of performance which are higher than the cumulative effect of the basic properties of those solid lubricants when considered separately.

The solid lubricants preferably used in the invention comprise at least compounds of class 2 which have been little used hitherto such as graphite fluorides and tin or bismuth sulphides. They differ from the traditional solid lubricating products such as graphite (which is likely to facilitate the occurrence of corrosion), molybdenum disulphide (which is known to be unstable in particular in the presence of moisture and to give off sulphur oxide which is corrosive for steel or hydrogen sulphide which possibly makes steel sensitive to differed hydrogen-induced stress rupture (referred to as "sulphide stress cracking" or SSC)) or tungsten disulphide, because of their greater capacity for bonding with the metals and their levels of performance under extreme pressures, which are markedly greater. When used in synergy with solid lubricants of other classes they make it possible to achieve particularly remarkable levels of performance.

The above-mentioned class 2 compounds can be used in the form of particles with particles of solid lubricant from at least one of classes 1, 3 and 4. Thus it is possible to use particles of at least one solid lubricant of class 2 and at least one solid lubricant of class 4, or particles of at least one solid lubricant of class 1 and at least one solid lubricant of class 2, or particles of at least one solid lubricant of class 2 and at least one solid lubricant of class 3, or again particles of at least one solid lubricant of class 1, at least one solid lubricant of class 2 and at least one solid lubricant of class 4.

An increase by 50% in the number of make up and break out cycles under building site conditions was observed with systems associating classes 1, 2 and 4, with respect to a synergy of class 2/class 4 type.

By way of example the particles of solid lubricant of class 1 may be particles of boron nitride or zinc oxide. Also by way of example the particles of solid lubricant of class 2 may be particles of graphite fluoride, tin sulphide, tungsten sulphide or bismuth sulphide. The particles of class 3 may be particles of Desilube 88 (marketed by Desilube Technologies Inc.). Still by way of example the particles of solid lubricant of class 4 may be particles of polytetrafluoroethylene (PTFE). Particularly highly performing synergies are achieved with the following combinations: graphite fluoride (class 2)/PTFE (class 4)/boron nitride (class 1), tin disulphide (class 2)/PTFE (class 4)/boron nitride (class 1), bismuth sulphide (class 2)/PTFE (class 4)/boron nitride (class 1), and $CF_x$ (class 2)/ZnO (class 1)/PTFE (class 4).

As indicated hereinbefore the lubricating composition according to the invention, in addition to the matrix (or binder) and possible particles of solid lubricant or lubricants, comprises at least one braking additive (or pigment). Each braking additive (or pigment) is dispersed in the matrix.

The braking additive or additives (or pigment or pigments) is or are selected as a function of the make up torque profile of the tubular threaded joint, of which it is to partially cover one at least of the male and female threaded elements EM and EF respectively. More precisely it or they is or are selected in such a way as to impart to the composition, in addition to its lubricating properties, a coefficient of friction which is selected to make it possible to achieve a torque on shoulder resistance value CSB which is at least equal to a threshold value.

If for example the reference value selected for the torque on shoulder resistance CSB is that which is defined by a make up torque profile of a given tubular threaded joint partially covered with a grease of type API RP 5A3 (or API Bull. 5A2), then the threshold value of the torque on shoulder resistance value CSB for that same tubular threaded joint can be selected to be at least equal to 70% of that reference value. Of course, depending on the type of use, it may be preferred to have a composition making it possible to obtain a torque on shoulder resistance value CSB which is close to 70% (as a value which is higher or equal) of the reference value or rather close to 100% of that reference value or indeed even higher than 100% of the reference value.

The value of 70% is chosen here so as to retain a sufficient margin to make it possible to use the lowest make up torque which permits a quality tightening.

Threshold values for the torque on shoulder resistance of less than 70% of the reference value can of course be selected in certain applications. They are however not sufficient for the applications in which the tubular threaded joints are made up under relatively high levels of torque. In fact in that case it is no longer possible to make up the threaded joint using the standard nominal torque (provided with coating of the threaded elements with the standard grease API) except at the risk in some cases of the screwing abutment of one at least of the two male and female threaded elements EM and EF respectively being the subject of plastic (irreversible) deformation or the correct make up criterion (ratio between shouldering torque CAB and optimum torque) not being fulfilled.

It will be understood that each braking additive is selected as a function of specific physical properties which make it possible to impart to the composition according to the invention a capacity for "braking" the movement applied in the make up operation in a lubricated condition as a function of the make up torque profile of the tubular threaded joint and therefore the implementation of the latter. Indeed two materials in relative friction and separated by an interposed third body (here the lubricating composition) owe their properties to at least two factors: the rheological behaviour of the third body and the behaviour of certain solid compounds which are involved in the composition of that third body.

The rheological behaviour of the third body may be hydrodynamic in the case of an oil, viscoplastic in the case of certain waxes and certain polymers, or granular in the case of certain mineral compounds which are not ductile or which are of very great hardness.

The behaviour of certain solid compounds which are involved in the composition of the third body varies in accordance with certain parameters:

the concentration of the third body in the hydrodynamic or viscoplastic medium, the hardness or capacity for crushing of the particles of solid compounds, which is characterised by the Mohs hardness value, the capacity for cleaving of the crystals of solid compounds with forces which are of greater or lesser magnitude, which depends primarily on the crystalline structure, the particle interactions which depend on the form and the surface energy of the particles of solid compounds, and the bonding capacities between those particles (attraction between atoms by way of bonds of Van der Waals type, as a function of the chemical nature of the particles); those interactions having a tendency to resist movement, and the inverse rheological behaviours (or involving inverse thixotropy) of certain organic additives of very high molecular weight, which make it possible to oppose a shearing force and therefore movement Each braking additive is therefore preferably formed by dispersions and/or solutions of mineral or organic particles which according to the requirements involved have a relatively high cleaving force value (that is to say which involve a cleaving effect which requires medium or high shearing values or stresses to occur) and/or strong particle interactions or attractive bonds between particles and/or a medium to high Mohs hardness (but without abrasive character) and/or a rheological behaviour which resists or opposes the movement in solution.

It is possible to mix into the lubricating composition braking additives which have different specific physical properties which are jointly useful for braking. Thus in the case of a thermoplastic or (viscoplastic) matrix it is possible for example (and not with limiting intent) to use a combination of titanium dioxide, the structural behaviour of which involves braking (cleaving with a high level of resistance) and bismuth trioxide whose Mohs hardness is medium in such a way as not to damage the threaded elements of the tubular threaded joint. With such a combination it is possible to achieve a torque on shoulder resistance value CSB of between about 70% and about 80%.

By way of non-limiting example the composition by weight of braking additives can be for example as follows:

| | |
|---|---|
| bismuth trioxide | 25 to 99% |
| titanium dioxide | 1 to 75%. |

Of course, braking additives other than bismuth oxides and titanium oxides can be used, in particular in combination. That is the case for example with colloidal silica, for example of pyrogenic spherular type, the size of the particles of which is some tens of nanometers (which has a high level of particle interaction and a high Mohs hardness) and carbon black having the same granulometric characteristics (which has a very high level of particle interaction). With a braking additive of colloidal silica type alone, it is possible to achieve a torque on shoulder resistance value CSB of between about 90% and about 100%. With a braking additive of carbon black type combined with another braking additive of Aerosil® type (marketed by Degussa), it is possible to obtain a torque on shoulder resistance value CSB of between about 110% and about 130%. With a braking additive of carbon black type alone it is possible to obtain a torque on shoulder resistance value CSB of between about 120% and about 140%. It is also possible to use a braking additive of acrylic polymer type.

It will be considered hereinafter that the lubricating composition comprises a solid matrix, one or more solid lubricants and one or more braking additives. The invention however also concerns lubricating compositions which are referred to as semi-dry, comprising a pasty matrix and at least one extreme-pressure additive with a chemical action (as described in particular in U.S. Pat. No. 6,933,264) as well as one or more braking additives of the type described herein.

It is important to note that the respective proportions of the three types of constituent in the lubricating composition depend principally on the type (thermoplastic, thermosetting or other) of the solid matrix used. For example when the solid matrix is of thermoplastic type the lubricating composition may comprise a proportion of matrix of between about 45% and about 93%, a proportion of solid lubricant or lubricants of between about 1% and about 25%, and a proportion of braking additive or additives of between about 5% and about 20%.

By way of purely illustrative and non-limiting example the composition by weight of a thermoplastic matrix may be for example as follows:

| | |
|---|---|
| polyethylene homopolymer | 5 to 96% |
| carnauba wax | 2 to 30% |
| zinc stearate | 2 to 30% |
| calcium sulphonate derivative | 0 to 50% |
| alkyl polymethacrylate | 0 to 15% |
| colouring agent | 0 to 1% |
| anti-oxidant | 0 to 1%. |

Still by way of purely illustrative and non-limiting example the composition by weight of a thermoplastic matrix in the form of an aqueous emulsion can be for example as follows:

| | |
|---|---|
| polyethylene emulsion | 0 to 50% |
| acrylic emulsion | 10 to 80% |
| calcium sulphonate derivative | 1 to 40% |
| alkyl polymethacrylate | 1 to 40% |
| zinc stearate emulsion | 10 to 50%. |

Moreover it will be understood that the variations in the different proportions of the three types of constituent in the lubricating composition, relative to each other, depend in particular on the type of tubular threaded joint that it is to partially cover and the stresses to which that tubular threaded joint is to be subjected, in particular under working site conditions.

Determining the respective compositions by weight of the three types of constituent (solid matrix, solid lubricant or lubricants and braking additive or additives) of a lubricating composition may be carried out for example by means of theoretical simulations with a data processing program running on a computer and tribological tests carried out by means of a machine that the man skilled in the art (a specialist in tribology) knows by the name of a Bridgman machine. That type of machine is described in particular in the article by D. Kuhlmann-Wilsdorf et al. "Plastic flow between Bridgman anvils under high pressures", J. Mater. Res., Vol. 6, No 12, December 1991.

Figure 5:
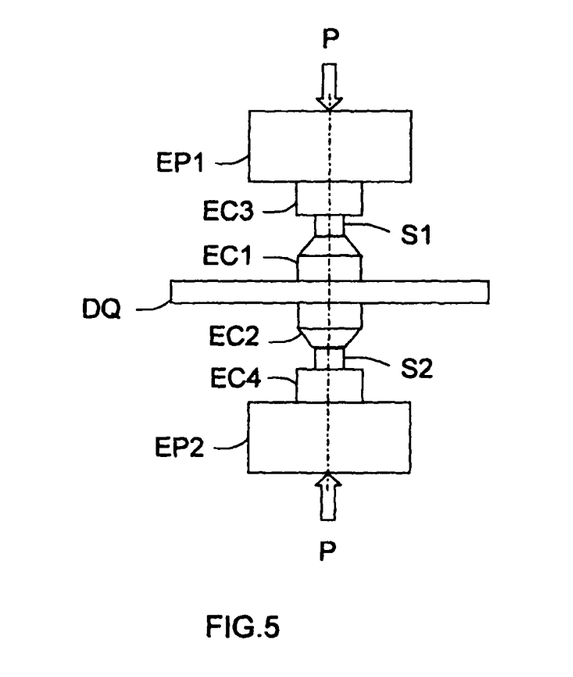
FIG. 5 is a diagrammatic functional view of an embodiment of a machine of Bridgman type.

A diagrammatic and functional example of a Bridgman machine is illustrated in FIG. 5. That machine comprises:
- a disc DQ which can be driven in rotation at selected speeds,
- a first anvil EC1, preferably of conical type, which is fixedly secured to a first face of the disc DQ,
- a second anvil EC2, preferably of conical type, which is fixedly secured to a second face of the disc DQ, opposite to its first face,
- first and second pressure elements EP1 and EP2, such as for example pistons, capable of exerting selected axial pressures P,
- a third anvil EC3, preferably of cylindrical type, which is fixedly secured to a face of the first pressure element EP1, and
- a fourth anvil EC3, preferably of cylindrical type, which is fixedly secured to a face of the second pressure element EP2.

To test a lubricating composition the composition is used to cover two pieces of a material identical to that constituting a threaded element in such a way as to form first and second samples S1 and S2. The first sample S1 is then interposed between the free faces of the first and third anvils EC1 and EC3 and the second sample S2 is interposed between the free faces of the second and fourth anvils EC2 and EC4. The disc DQ is then rotated at a selected speed while applying a selected axial pressure P (for example of the order of 1.5 GPa) with each of the first and second pressure elements EP1 and EP2 and the make up torque to which each sample S1, S2 is subjected is measured.

The axial pressure, the speed of rotation and the angle of rotation are selected in the Bridgman test to simulate the Hertzian pressure and the relative speed of the abutment surfaces at the end of make up.

Thanks to such a machine it is possible to establish a number of different pairs (make up torque, speed of rotation) for measuring the corresponding make up torques on the samples S1 and S2 and thus verifying if those samples S1 and S2 approximately follow a given make up torque profile and in particular if they may make it possible to achieve a torque on shoulder resistance value CSB which is at least equal to a threshold value selected in relation to that profile. It will be understood that the tests carried out with the Bridgman machine are those which make it possible to establish a correlation between the torque measured for samples coated with a lubricating composition according to the invention and a percentage of torque on shoulder resistance CSB which is obtained in operations of make up of threaded elements coated with the same lubricating composition.

In order to improve certain selected properties of the composition according to the invention the matrix thereof may comprise additional elements such as those non-exhaustively listed hereinafter.

Thus, improved plasticity of the matrix of the composition may be achieved by the addition of chemical compounds of metallic soap type, among which soaps (or stearates) of calcium, lithium, aluminium, bismuth and zinc give excellent results in terms of the number of make up and break out operations under site conditions as well as an improvement in the debris re-agglomeration properties. It will be recalled that the term "metallic soap" is used to mean fusible compounds such as soaps of alkali and alkaline-earth metals and other metals. By way of example it is possible to use a metallic soap such as zinc stearate which has a synergy effect with certain corrosion inhibitors.

For example, to improve the lubrication afforded by the composition and in particular to optimise its properties for blocking and re-agglomerating debris during make up-break out operations, its matrix may comprise a natural fatty substance such as a wax of vegetable, animal, mineral or synthetic origin. It will be recalled that the term "wax" is used to mean fusible substances having lubricating properties of various origins (mineral, in particular resulting from the distillation of petroleum, vegetable, animal or synthetic), for which the more or less pasty or hard consistency and the melting temperature as well as the dropping point may vary to substantial proportions depending on their nature. By way of example it is possible to use carnauba wax. The matrix may have an increased adhesion when comprising a resin (mineral, vegetable or synthetic), for example a terpene resin or a derivative thereof.

It will be noted that, depending on the contents of corrosion inhibitors necessary, a deterioration in the properties of trapping or re-agglomerating debris may be observed. To remedy that disadvantage it is possible to use highly viscous polymers such as alkyl polymethacrylates (PAMA), polybutenes, polyisobutenes and polysiloxanes. Thus excellent debris re-agglomeration results can be obtained with a PAMA of a kinematic viscosity of 850 $mm^2/s$ at 100° C. as marketed by ROHMAX under the name VISCOPLEX 6-950.

For example to improve the protection of the surface that the composition is to cover against various types of corrosion the matrix thereof may comprise a corrosion inhibitor. It will be recalled that the term "corrosion inhibitor" is used to mean an additive which imparts to a liquid or solid material applied to a surface the capacity for protecting it by a chemical, electrochemical or physico-chemical mechanism. By way of example it is possible to use a derivative of calcium sulphonate or a calcium oxydate and more particularly one of those arising out of the association of calcium oxide and calcium sulphonates in a medium formed by waxes, petroleum resins or paraffins such as the products marketed by LUBRIZOL under the names ALOX® 2211 Y and ALOX® 606. Other compounds however may equally be used such as those of amine, aminoborate, quaternary amine, sulphonate super-alkalinised on polyalfaolefin, strontium phosphosilicate, zinc phosphosilicate and borate carboxylate type.

Resistance to corrosion may be further improved by associating the selected corrosion inhibitor with compounds acting in accordance with other corrosion-blocking mechanisms. As indicated hereinbefore zinc stearate in particular exhibits synergistic properties with corrosion inhibitors while largely contributing to the lubricating characteristics of the matrix.

The main test in respect of anti-corrosion protection is the saline mist test which is performed in accordance with the standard ISO 9227 and evaluated by the index Re in accordance with ISO EN 2846-3 on a plate treated by phosphatation with manganese (deposit of 8 to 20 g/m² of phosphate). It is possible to achieve improvements in the level of performance in the saline mist test in accordance with those standards (increase in 20% of the time for corrosion to appear) by inserting particles of zinc oxide of nanometric size (200 nm on average), which are used in simple dispersion in water.

For example, in order to enable the composition to provide for stable blocking of the sites which are created by the surface roughnesses and to block the processes involved in damage to the surfaces and the propagation thereof while creating a continuous structure of cleavable type at the surface, the composition may comprise molecules of at least one fullerene of spherical geometry. It will be recalled that the term "fullerenes" is used to mean molecular materials involving a structure in the form of closed or open tubes or closed spheres, of a single-layer or multi-layer structure. The spherical fullerenes involve a size of some tens of nm in the single-layer configuration and greater than about 100 nm in the multi-layer configuration. It will be noted that, due to their size and their capacity for interactivity, fullerenes may have a determining effect on the rheology of the medium by introducing an additional phenomenon in the viscous resistance to movement.

For example to permit visual identification of the treated surfaces the matrix of the composition may comprise at least one colouring agent. Any type of known organic colouring agent may be used provided that the content thereof does not degrade the levels of frictional performance. It is possible for example to use colouring agents in proportions of about 1%.

For example to preserve the coating from deterioration by oxidation due for example to heat or exposure to UV rays the matrix of the composition may comprise at least one anti-oxidant. It will be recalled that polyphenolic compounds, derivatives of naphthylamine and organic phosphites constitute the main families of anti-oxidants. For example it is possible to use a combination of the products IRGANOX® L150 (system of polyphenolic and amino anti-oxidants) and IRGAFOS® 168 (tris(2,4-di-tert-butylphenyl)phosphite) from Ciba-Geigy.

Surface preparation of the portions to be lubricated of the male and female threaded elements EM and EF respectively may be found to be advantageous. Indeed make up and break out tests show that, to achieve the establishment of a correct transfer film, it is preferable to modify the surface to be coated so as to make it capable of adsorbing or absorbing the lubricating composition either by a mechanical treatment such as sand blasting or shot blasting, or by physical or chemical modification of the surfaces by means of a reactive or non-reactive treatment based on mineral deposits which are crystallised at the surface, a chemical attack for example using an acid, a phosphatation treatment using zinc or manganese or an oxalatation treatment leading to a chemical conversion layer at the surface. Among those surface treatments phosphatation is preferred as it makes it possible to achieve a good bonding surface leading to the establishment of a transfer film which is resistant during friction and highly stable, as well as base anti-corrosion protection.

It may moreover be desirable to implement an additional surface preparation consisting in particular in impregnating the porosity of the surface with nanomaterials, the size of which permits them to be inserted into the porosities. The objective of that impregnation operation is to block and saturate the sites created by the porosity by means of a material having a passivating action for protecting the surface from corrosion while preserving good adhesion of the coating.

Two non-limiting examples of the composition are set forth hereinafter. Those examples are well suited to tubular threaded joints of type VAM TOP HC of a nominal diameter of 177.8 mm (7 in) and of a linear mass of 43.15 kg/m (29 lb/ft) of slightly alloyed steel (grade L80) in accordance with the technical specification edited by the OCTG division of Vallourec & Mannesmann Tubes. Prior to application of the coating (composition) the male threaded element has for example been subjected to phosphatation with zinc (the weight of the layer is between 4 and 20 g/m²) and the female threaded element was subjected to phosphatation with manganese (the weight of the layer was between 8 and 20 g/m²). The male and female threaded elements EM and EF respectively are preheated to 130° C. and then thermal spraying is used to apply thereto a layer 35 μm in thickness of a lubricating composition which is kept in a molten state at 150° C., of the following composition by weight:

Polyethylene marketed by CLARIANT under the name LICOWAX® PE 520: 9%,
Carnauba wax: 15%,
Zinc stearate: 15%,
PAMA marketed by ROHMAX under the name VISCO-PLEX® 6-950: 5%,
Derivative of calcium sulphonate marketed by LUBRI-ZOL under the name ALOX® 606: 40%,
Graphite fluoride: 3.5%,
Zinc oxide: 1%,
Titanium dioxide: 5%,
Bismuth trioxide: 5%,
Silicone: 1%, and
Anti-oxidants marketed by Ciba-Geigy:

| | |
|---|---|
| IRGANOX ® L150 | 0.3% |
| IRGAFOS ® 168 | 0.2%. |

In this example the matrix is of viscoplastic type, the solid lubricants are composed of zinc oxide and graphite fluoride and the braking additives are formed by titanium oxide (with a high cleaving force) and bismuth trioxide (of moderate Mohs hardness).

In a variant, the composition comprises 1 to 60% by weight, preferably 5 to 30%, of a colophonic ester resin, for example DERTOLYNE P2L by the company LES DERIVES RESINIQUES ET TERPENIQUES (DRT).

As an example, the composition may be:
Carnauba wax: 14%
Zinc Stearate: 14%
Resin Dertolyne P2L: 20%
Viscoplex 6-950 (Polyalkyl metacrylate): 8%
Halox SZP 391 (calcium and strontium Phosphosilicate): 29%
Graphite fluoride: 7%
Bi2O3: 5%
PTFE: 2%
Boron nitride: 1%

In a variant it is possible for example to apply by thermal spraying to the male and female threaded elements EM and EF respectively which are preheated to 130° C., a layer of a thickness of 35 μm of a lubricating composition which is kept in the molten state at 150° C., of the following composition by weight:

Polyethylene marketed by CLARIANT under the name LICOWAX® PE 520: 26%,
Carnauba wax: 10%,
Zinc stearate: 20%, PAMA marketed by ROHMAX under the name VISCO-PLEX® 6-950: 5%,
Derivative of calcium sulphonate marketed by LUBRI-ZOL under the name ALOX® 606: 30%,
Graphite fluoride: 3.5%,
Titanium dioxide: 5%,
Anti-oxidants marketed by Ciba-Geigy:

| IRGANOX ® L150 | 0.3% |
|---|---|
| IRGAFOS ® 168 | 0.2%. |

In that variant the matrix is also of viscoplastic type, the solid lubricant is composed of graphite fluoride and the braking additive is formed by titanium dioxide.

The above-mentioned procedure of spraying in the molten state involves keeping the lubricating composition at a high temperature in the liquid phase and spraying it by means of thermostatically controlled spray guns. The lubricating composition is heated at between 10° C. and 50° C. above its melting temperature and sprayed onto a surface preheated to a temperature higher than the melting temperature in order to provide for good covering of the surface.

Instead of using that procedure of spraying in the molten state it is possible for example to spray the lubricating composition in the form of an aqueous emulsion. The emulsion and the substrate can be at ambient temperature, a drying time then being required. That drying time can be considerably reduced by preheating the lubricating composition at between 60° C. and 80° C. and/or the surface at between 50° C. and 150° C.

The invention is not limited to the examples of a lubricating composition and a threaded element (male or female) as described hereinbefore solely by way of example but it embraces all variants that the man skilled in the art can envisage within the scope of the accompanying claims.

Thus the invention also concerns other types of threaded elements than those described hereinbefore (VAM TOP). For example it also concerns threaded elements of tubular threaded joints with an internal abutment, which are sleeved (for example those of type NEW VAM, VAM ACE, DINO-VAM, VAM HW ST) or integral, being "flush" or "semi-flush" (for example those of type VAM SL, VAM MUST, VAM HP, VAM HTF).

The invention can also concern elements of threaded joints for pipes and other rotary drilling components as defined by the specification API 7 or by more severe specifications which are specific to certain producers (such as for example and without limitation the premium threaded joints VAM EIS, VAM TAURUS, TORQMASTER TM4 and the derivatives and evolutions of those joints).

Moreover the foregoing description principally described a lubricating composition comprising a matrix of solid consistency, one or more solid lubricants and one or more braking additives. The invention however also concerns semi-dry lubricating compositions comprising a pasty matrix, at least one extreme-pressure additive with a chemical action and one or more braking additives.

The invention claimed is:

1. A film-forming lubricating composition for make up of threaded joints suitable for covering at least one thread and a screwing abutment of a threaded element of a component of a tubular threaded joint with a film in the solid state which is adhesive to said thread and said screwing abutment, said screwing abutment being intended to bear against another abutment of another component of said tubular threaded joint in the terminal make up phase, said lubricating composition comprising:
   a thermoplastic matrix; and
   at least one braking additive;
   wherein the thermoplastic matrix is an aqueous emulsion comprising:

| polyethylene emulsion | 0 to 50 wt % |
|---|---|
| acrylic emulsion | 10 to 80 wt % |
| calcium sulphonate derivative | 1 to 40 wt % |
| alkyl polymethacrylate | 1 to 40 wt % |
| zinc stearate emulsion | 10 to 50 wt %, | the at least one braking additive is arranged to allow a torque on shoulder resistance value to be obtained which is at least equal to a threshold value equal to 100% of a torque on shoulder resistance reference value of a grease of type API RP 5A3 obtained for said tubular threaded joint, and
the at least one braking additive is selected from the group consisting of bismuth oxide, titanium oxide, a colloidal silica, an acrylic polymer and carbon black,
the at least one braking additive is dispersed in the thermoplastic matrix and
the at least one braking additive is selected to impart to the composition, in addition to lubrication, a coefficient of friction selected in such a way as to obtain a torque on shoulder resistance value which is at least equal to a threshold value.

2. The film-forming lubricating composition according to claim 1 wherein the braking additive composition is carbon black alone.

3. The film-forming lubricating composition according to claim 1 wherein the at least one braking additive is pyrogenic spherular colloidal silica.

4. The film-forming lubricating composition according to claim 1, further comprising particles of at least one solid lubricant which are dispersed in the thermoplastic matrix with the at least one braking additive.

5. The film-forming lubricating composition according to claim 4 wherein said particles of at least one solid lubricant comprise particles of lubricants of at least one of the classes 1, 2, 3 and 4.

6. The film-forming lubricating composition according to claim 5 wherein the particles of the at least one solid lubricant comprise particles of at least one solid lubricant of class 2 and at least one solid lubricant of class 1.

7. The film-forming lubricating composition according to claim 5 wherein the particles of the at least one solid lubricant comprise particles of at least one solid lubricant of class 2 and at least one solid lubricant of class 4.

8. The film-forming lubricating composition according to claim 5 wherein the particles of the at least one solid lubricant comprise particles of at least one solid lubricant of class 1, at least one solid lubricant of class 2 and at least one solid lubricant of class 4.

9. The film-forming lubricating composition according to claim 5 wherein the particles of the at least one solid lubricant comprise at least particles of at least one solid lubricant of class 1 selected from zinc oxide and boron nitride.

10. The film-forming lubricating composition according to claim 5 wherein the particles of the at least one solid lubricant comprise particles of at least one solid lubricant of class 2 selected from graphite fluoride, tin sulphides, bismuth sulphides and tungsten disulphide.

11. The film-forming lubricating composition according to claim 5 wherein the particles of the at least one solid lubricant comprise at least particles of polytetrafluoroethylene as a solid lubricant of class 4.

12. The film-forming lubricating composition according to claim 5 wherein the particles of the at least one solid lubricant comprise at least molecules of at least one fullerene of spherical or tubular geometry.

13. The film-forming lubricating composition according to claim 1 wherein the thermoplastic matrix is of a solid consistency, not sticky to the touch and has a plastic rheological behaviour or a viscoplastic rheological behaviour.

14. The film-forming lubricating composition according to claim 13 wherein a melting point of the thermoplastic matrix is between 80° C. and 400° C.

15. The film-forming lubricating composition according to claim 13 wherein the thermoelastic matrix comprises at least one binder with viscoelastic behaviour.

16. The film-forming lubricating composition according to claim 1 wherein the thermoelastic matrix further comprises at least one wax of vegetable, animal, mineral or synthetic origin.

17. The film-forming lubricating composition according to claim 1 wherein the thermoelastic matrix further at least one corrosion inhibitor.

18. The film-forming lubricating composition according to claim 17 wherein the at least one corrosion inhibitor is selected from the group consisting of a calcium sulphonate and a calcium oxydate.

19. The film-forming lubricating composition according to claim 1 wherein the thermoelastic matrix further comprises at least one liquid polymer of a kinematic viscosity at 100° C. which is at least equal to 850 mm$^2$/s.

20. The film-forming lubricating composition according to claim 19 wherein said liquid polymer is selected from the group consisting of an alkyl polymethacrylate, a polybutene, a polyisobutene and a polydialkylsiloxane.

21. The film-forming lubricating composition according to claim 1 wherein the thermoplastic matrix further comprises at least one colouring agent.

22. The film-forming lubricating composition according to claim 1 wherein the thermoelastic matrix further comprises at least one surface-active agent, wherein the surface active agent promotes bonding to the surface and homogeneity of the coating.

23. The film-forming lubricating composition according to claim 1 wherein the thermoelastic matrix further comprises at least one anti-oxidant.

24. The film-forming lubricating composition according to claim 4 wherein the solid lubricant comprises: 65 to 99 wt % graphite fluoride and 1 to 35 wt % zinc oxide.

25. The film-forming lubricating composition according to claim 4 wherein the solid lubricant comprises:

| | |
|---|---|
| 20 to 99 wt % | graphite fluoride; |
| 0 to 30 wt % | boron nitride; and |
| 1 to 80 wt % | polytetrafluoroethylene. |

26. The film-forming lubricating composition according to claim 4 wherein the solid lubricant comprises:

| | |
|---|---|
| 20 to 99 wt % | tin sulphides; |
| 0 to 30 wt % | boron nitride; and |
| 1 to 80 wt % | polytetrafluoroethylene. |

27. The film-forming lubricating composition according to claim 4 wherein the solid lubricant comprises:

| | |
|---|---|
| 20 to 99 wt % | bismuth sulphides; |
| 0 to 30 wt % | boron nitride; and |
| 1 to 80 wt % | polytetrafluoroethylene. |

28. The film-forming lubricating composition according to claim 4, comprising:
   45 to 93 wt % of the thermoplastic matrix;
   1 to 25 wt % of the at least one solid lubricant; and
   5 to 20 wt % of the at least one braking additive.

29. The film-forming lubricating composition according to claim 1 wherein the thermoplastic matrix is of pasty consistency and further comprises at least one extreme-pressure additive with a chemical action.

\* \* \* \* \*

UNITED STATES PATENT AND TRADEMARK OFFICE
CERTIFICATE OF CORRECTION

PATENT NO. : 8,673,828 B2  Page 1 of 1
APPLICATION NO. : 12/595091
DATED : March 18, 2014
INVENTOR(S) : Eliette Pinel et al.

It is certified that error appears in the above-identified patent and that said Letters Patent is hereby corrected as shown below:

In the Specification

Column 5, Line 4, "80° C. and 400° C.;" should read --"80° C and 400° C;"--
Column 5, Line 5, "80° C. and 400° C.;" should read --"80° C and 400° C;"--
Column 5, Line 32, "100° C." should read --100° C--
Column 10, Line 16, "80° C. and 400° C." should read --"80° C and 400° C."--
Column 16, Line 40, "100° C." should read --100° C--
Column 18, Line 14, "130° C." should read --130° C--
Column 18, Line 16, "150° C.," should read --150° C,--
Column 18, Line 60, "130° C.," should read --130° C,--
Column 18, Line 62, "150° C.," should read --150° C,--
Column 19, Line 21, "10° C. and 50° C." should read --10° C and 50° C--
Column 19, Line 31, "60° C. and 80° C." should read --60° C and 80° C--
Column 19, Line 31, "50° C. and 150° C." should read --50° C and 150° C.--

In the Claims

Claim 14, Column 21, Line 16, "80° C." should read --80° C--
Claim 19, Column 21, Line 33, "100° C." should read --100° C--

Signed and Sealed this
Ninth Day of September, 2014

Michelle K. Lee
*Deputy Director of the United States Patent and Trademark Office*